US010661707B2

(12) United States Patent
Matovich

(10) Patent No.: US 10,661,707 B2
(45) Date of Patent: May 26, 2020

(54) AUXILIARY LIGHTING SYSTEM AND METHOD FOR PROVIDING AN INDICATOR OR BRAKE MAGNITUDE ON A VEHICLE

(71) Applicant: Maurice Matovich, Ponte Vedra Beach, FL (US)

(72) Inventor: Maurice Matovich, Ponte Vedra Beach, FL (US)

( * ) Notice: Subject to any disclaimer, the term of this patent is extended or adjusted under 35 U.S.C. 154(b) by 0 days.

(21) Appl. No.: 16/448,625

(22) Filed: Jun. 21, 2019

(65) Prior Publication Data

US 2019/0389369 A1   Dec. 26, 2019

Related U.S. Application Data

(60) Provisional application No. 62/688,443, filed on Jun. 22, 2018.

(51) Int. Cl.
| | |
|---|---|
| *B60Q 1/14* | (2006.01) |
| *B60Q 1/44* | (2006.01) |
| *H05B 45/10* | (2020.01) |
| *H05B 47/19* | (2020.01) |

(52) U.S. Cl.
CPC ............. *B60Q 1/444* (2013.01); *H05B 45/10* (2020.01); *H05B 47/19* (2020.01); *B60Q 2400/10* (2013.01); *B60Q 2900/30* (2013.01)

(58) Field of Classification Search
CPC ...................................................... B60Q 1/444
USPC ........................................ 340/467, 469, 669
See application file for complete search history.

(56) References Cited

U.S. PATENT DOCUMENTS

| | | | | |
|---|---|---|---|---|
| 9,139,131 B2* | 9/2015 | Jones | ...................... | B60Q 1/444 |
| 2014/0354422 A1* | 12/2014 | Olson | ..................... | B60Q 1/445 |
| | | | | 340/465 |
| 2014/0375448 A1* | 12/2014 | Lee | ........................ | B60Q 1/444 |
| | | | | 340/479 |

* cited by examiner

*Primary Examiner* — Thuy V Tran
(74) *Attorney, Agent, or Firm* — Joseph P. Kincart; Rogers Towers, P.A.

(57) ABSTRACT

Instead of binary brake lights on a car, the present disclosure provides methods and apparatus to provide an indicator of brake magnitude of the car. A pressure sensor, accelerometer, or other device capable of approximating the magnitude of a braking force is coupled to a control module, which itself is coupled to auxiliary lights mounted on the car. These auxiliary lights are capable of displaying a pulse, color, or a pattern correlated to the magnitude of the braking force. This gives drivers behind the car an indication of how quickly to respond to a braking car.

20 Claims, 4 Drawing Sheets

FIG. 3C     FIG. 3D

AUXILIARY LIGHTING SYSTEM AND METHOD FOR PROVIDING AN INDICATOR OR BRAKE MAGNITUDE ON A VEHICLE

FIELD OF THE DISCLOSURE

The present disclosure relates to methods and apparatus to provide an auxiliary lighting system for a motor vehicle, wherein the auxiliary lighting system is responsive to an acceleration or deceleration action.

BACKGROUND OF THE DISCLOSURE

Car crashes are the leading cause of death for American children (according to a 2016 study). Cars are multi-ton machines capable of driving at high speeds that can only be stopped with effective brakes and fast reflexes by their drivers. Even a driver with fast reflexes is subject to human limitations. These limitations can be ameliorated by technology, such as brake lights on a car in front of the driver indicating that that car is in the process of braking, and therefore the driver should himself prepare to brake. But brake lights are binary and therefore serve as poor indicators of how quickly braking is necessary.

Brake lights, like many vehicle safety issues, are governed by strict regulations in many countries. For example, in the United States, commercial vehicle safety is regulated by 49 C.F.R. Chapter III, Subchapter B, and in particular Part 393, which regulates "Parts and Accessories Necessary for Safe Operation". Passenger vehicle safety is regulated by 49 C.F.R. Chapter V, and in particular Part 571, which regulates "Federal Motor Vehicle Safety Standards". For example, 49 C.F.R. § 571.108 specifies manufacturer-installed lamps, reflective devices, and associated equipment, including brake lights.

U.S. federal regulations specify macroscopic features of brake lights (e.g., color, minimum number of lights and their placement), but do not specify specific features such as shape of indicators or visible operation much beyond a simple on/off when brakes are applied. However, the effect of braking is more complex than can be described by a simple on/off indicator. For example, braking may be applied with a range of force, from a light tap that barely slows a vehicle, to a very hard press in a panic stop that may cause a skid even on dry pavement or activate an anti-lock brake system if installed. Different forces within this range have dramatically different effects upon vehicle deceleration, and consequently upon reactions that a driver in a vehicle behind the braking vehicle must make to try to avoid a collision.

However, a simple on/off indicator as in the known art provides no indication of a rate of deceleration to a following driver in a vehicle behind the braking vehicle. This may tend to cause dangerous situations. For example, a driver of the following vehicle may react too late to take evasive maneuvers, or may not brake soon enough or hard enough to avoid a collision. Conversely, a driver of the following vehicle may overreact by slowing too much or by taking unnecessary evasive maneuvers, thereby causing a collision with a third vehicle. Therefore, what is needed is one or more auxiliary lights that provides an indication of a rate of acceleration or of deceleration from braking, which lights are compatible with applicable safety regulations.

SUMMARY OF THE DISCLOSURE

Accordingly, the present disclosure supplies methods and apparatus for an auxiliary lighting system. According to the present disclosure, auxiliary lights are used to generate a lighting pattern, color, or pulse frequency to indicate the relative rate of deceleration, acceleration, or idleness.

Embodiments following the present disclosure methods and apparatus to provide a brake indicator responsive to a rate of deceleration or applied brake pressure. In some embodiments, the method and apparatus may use a sense of pressure applied to a brake pedal as an indication of a rate of deceleration or applied brake pressure. In some embodiments, the brake indicator responsive to a rate of deceleration or applied brake pressure may be provided as an auxiliary brake light that is added in addition to a manufacturer-installed brake light. In some embodiments, the light may be operative to indicate a rate of acceleration, or an indicator that the motor vehicle is idle or coasting.

The systems are intended to improve driving safety by adding to the functionality of automotive rear lights, which are typically used to identify braking and turning functions. The additional features described herein may allow the rear lighting to change displays when a vehicle is accelerating or decelerating, as well as to indicate the rate of speed change. In some embodiments, it can also display a neutral color (such as amber) when the vehicle is in idle, neutral mode, or coasting. This allows drivers behind the car to better anticipate the car's prospective movements.

Accordingly, the present invention improved road safety by giving more confidence to drivers in vehicles with the lighting systems described herein and assurance and additional information to other drivers on the road. While trailing drivers currently only know if the brake is being applied, such drivers—when following vehicles equipped with this invention—will know a rate of braking, thus reducing rear-end collisions and tailgating.

Brake lights serve a simple, but important, function: they warn trailing drivers of an impending slow down, which helps reduce rear-end collisions. The present invention will reduce rear-end collisions drastically.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIGS. 3A-3D illustrate various configuration of auxiliary lights, in accordance with an embodiment of the present invention;

The drawings are not necessarily drawn to scale unless clearly indicated otherwise. Dimensions, where shown, are typical dimensions in units of inches.

DETAILED DESCRIPTION

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure.

As used herein, deceleration is a negative change in speed over time, and acceleration is a positive change in speed over time. Although the following description generally discusses the present invention in terms of braking, deceleration, and brake lights, one of ordinary skill in the art will understand that the invention also covers acceleration or idling actions, such as coasting. Additionally, while the following description generally discusses the braking or acceleration mechanisms in terms of brake pedals and gas pedals, respectively, it is to be understood that the pedals are not meant to limit the invention. Any suitable means for acceleration or deceleration of the motor vehicle may be used in this invention (e.g., hand rear brake/clutch assemblies or software integrated with the motor vehicle).

Figure 1:
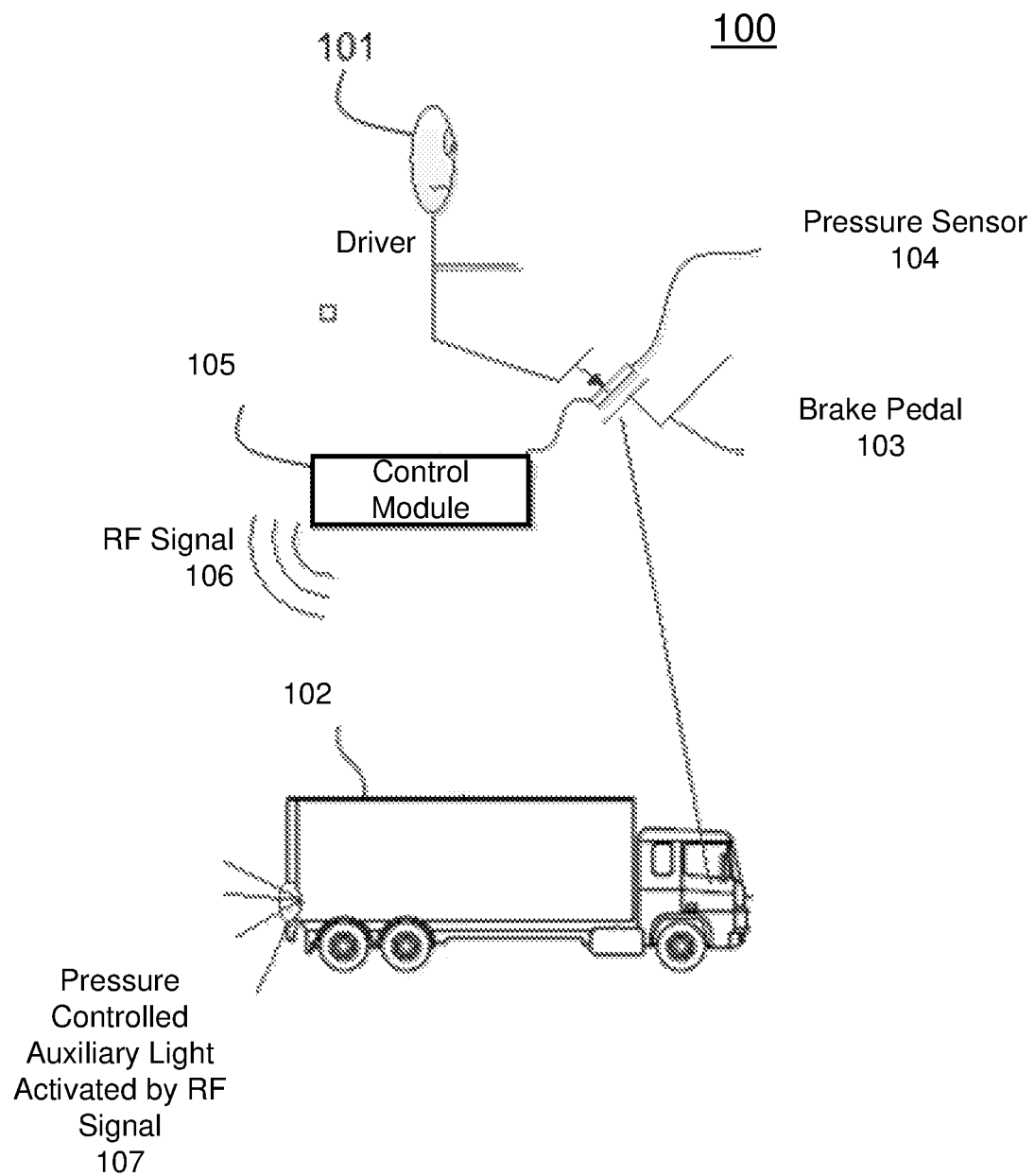
FIG. 1 illustrates a system to provide an auxiliary lighting system, in accordance with an embodiment of the present invention.

FIG. 1 illustrates a system 100 to provide an auxiliary lighting system, in accordance with an embodiment of the present invention. Specifically, system 100 illustrates an auxiliary brake light system. System 100 is used by driver 101, but driver 101 is not necessarily a part of system 100 (though in some embodiments, driver 101 may comprise an automaton or other automated means for operating a vehicle).

In FIG. 1, driver 101 controls vehicle 102 by pressing on brake pedal 103. A braking system of vehicle 102 detects the pressing of brake pedal 103, which then applies brakes of vehicle 102 and concurrently activates manufacturer-installed brake lights.

Embodiments include a sensor 104 (e.g., a pressure sensor) to detect a level of force (e.g., in units of pounds or Newtons) applied to brake pedal 103. Although a pressure sensor coupled to brake pedal 103 may be used to directly determine the magnitude of pressure applied, this type of sensor may be susceptible to being kicked or dislodged inadvertently during usage. Therefore, other types of sensors may be used. For example, sensor 104 may measure a travel distance of brake pedal 103 (e.g., in units of millimeters), measuring distance with an appropriate sensor such as an ultrasonic or optical range finder, and calculate a force from the amount of travel of brake pedal 103. In another embodiment, sensor 104 may measure an angular rotation of brake pedal 103 with an appropriate sensor, such as a gyroscope. Measurement of travel of brake pedal 103 by distance or angular movement may be affected by factors such as level of wear of brake pads and/or rotors, brake fluid level, and so forth. In other embodiments, work performed (i.e., force multiplied by distance) may be measured.

In other embodiments, a sensor may be coupled directly to one or more brake calipers to measure a level of force applied by the caliper to the brake pads. Similarly, for drum-style brakes, a sensor may be coupled to the brake shoe mechanism.

System 100 further includes a control module 105, which detects and processes signals from sensor 104. Control module 105, upon detection of a braking event, may include a transmitter or transponder to transmit a signal (e.g., radiofrequency (RF) signal 106) to a compatible receiver or transponder coupled to auxiliary lights 107. An RF signal 106 may have a frequency between around 20 kHz and around 300 GHz. RF signal 106, if used, may include security features to avoid snooping, spoofing, or interference from similarly-equipped adjacent vehicles on a highway. For example, an RF transponder in control module 105 may be paired via a secured protocol (e.g., Bluetooth) with an RF transponder coupled to auxiliary lights 107. The secured protocol may include privacy features such as encryption, spread spectrum, and so forth.

However, an RF signal may be susceptible to a hostile transmission environment arising from steel of vehicle 102 causing blockage or multi-path interference, or from interference caused by objects within vehicle 102. Therefore, a dedicated hardwired communication link may be used in place of RF signals 106. Although a dedicated hardwired communication link initially may be harder to install, a further advantage is that the communication link may be incorporated with or as part of voltage lines used to deliver a DC voltage (e.g., 12 volts) that lights up auxiliary lights 107. If a low-power lighting technology is used (e.g., LED lamps operating at 5 volts or 3.3 volts rather than incandescent lamps operating as 12 volts), auxiliary lights 107 may be direct-wired through the communication link to control module 105, without necessarily a need for separate DC voltage lines or a separate LED driver interface. In some embodiments, auxiliary lights 107 may include an LED driver interface, to generate LED driving signals from pattern instructions received from control module 105. For example, control module 105 may issue a pulse pattern command at a rate of 50% of maximum rate, and the LED driver interface would generate individual signals for each LED in auxiliary lights 107 to achieve an overall pulse pattern. In some embodiments, the LED signals may emit differently colored light, or light of a different intensity, to indicate the degree of braking.

On this note, in the embodiments of this invention capable of also indicating acceleration or idling, various well-known colors may be used to better indicate such motion, along with various dimming or pulsing effects to indicate a magnitude of the motion. For example, when the car is in neutral, idle, shifting gears, or coasting, the light may be a separate color from the traditional red, green, or white, such as yellow or amber (the standard caution light color). This amber light may be incorporated as the dominant light in auxiliary lights 107, or simply as a separate, thin, strip light installed horizontally from a first brake light to a second brake light along a tailgate, trunk gate, or bumper. This light would be activated in a manner similar to the brake light embodiment discussed above (for example, it could be based on a sensor associated with a brake pedal/mechanism, a gas pedal, or other acceleration mechanism (for example, if neither pedal is engaged), an accelerometer, or a rangefinder).

Although in most circumstances, brake pressure is highly correlated with deceleration (e.g., greater brake pressure provides greater deceleration), this relationship may not hold in extreme circumstances such as if vehicle 107 is hydroplaning, or is skidding on snow/ice, or if vehicle 107 is going up or down a steep incline. In such circumstances, signals from an accelerometer may be used instead to estimate the deceleration. For example, generally readings from an accelerometer will be correlated to some degree with input on the gas or brake pedals. An accelerometer should behave within a predictable tolerance when the gas pedal is pushed or released, or the brake pedal is pushed or released. If the accelerometer displays a sufficiently anomalous reading, this may be an indication that the car is hydroplaning or skidding.

Figure 2:
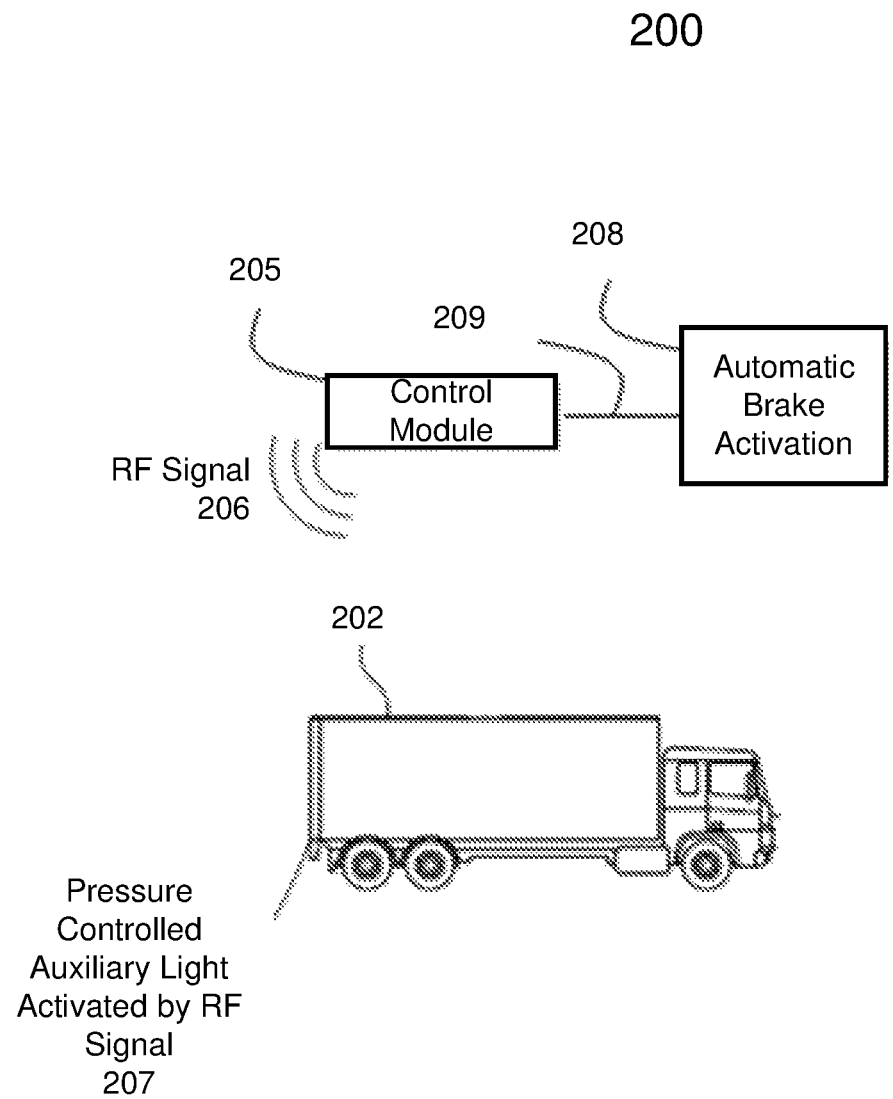
FIG. 2 illustrates another system to provide an auxiliary lighting system, in accordance with an embodiment of the present invention.

FIG. 2 illustrates a system 200 in accordance with an embodiment of the present invention. System 200 includes a communication link 209 to an automatic brake activation subsystem 208. Automatic brake activation subsystem 208 may include an anti-lock brake system, and/or an autonomous driving system. An autonomous driving system may include various sensors (e.g., optical, radar, infrared, acoustic, etc.) to detect dangerous situations (e.g., from other vehicles, pedestrians, fixed objects, etc.) and predict and/or apply the brakes. Communication link 209 may be, for example, a controller area network (CAN) that interfaces with a vehicle's onboard diagnostic (OBD) system. Control module 205 may include a physical interface and programming to support communication via communication link 209. In other respects, vehicle 202, RF signal 206 and auxiliary lights 207 may be substantially similar to vehicle 102, RF signal 106 and auxiliary lights 107, respectively.

Figure 3A:

FIGS. 3A-3D illustrate various embodiments of auxiliary lights 107, 207. In particular, FIG. 3A illustrates one or more rows of LEDs 301, only one of which is marked with a reference designator for sake of clarity. LEDs 301 in some embodiments may be red, and in other embodiments LEDs 301 may be multi-color LEDs. Control module 107, 207, together with an LED driver interface if used, may provide a pattern of lit LEDs 301 and/or colors of lit LEDs 301, such that auxiliary lights 107, 207 as a whole will be perceived to have effects designed to catch the attention of a driver behind vehicle 102, 202. The pattern may involve characteristics such as LED color, LED intensity (including off), LED frequency of pulsation, an alternating pattern, an apparent crawl rate of the LED display, and so forth, in order to achieve a perceived overall effect of, e.g., the color or other characteristics starting in the middle of FIG. 3A and moving or expanding toward the left and right ends. The rate of perceived change in pattern may be a function of brake pressure and/or deceleration, e.g., a faster pulsation for a greater deceleration (or acceleration, as the case may be).

Figure 3B:
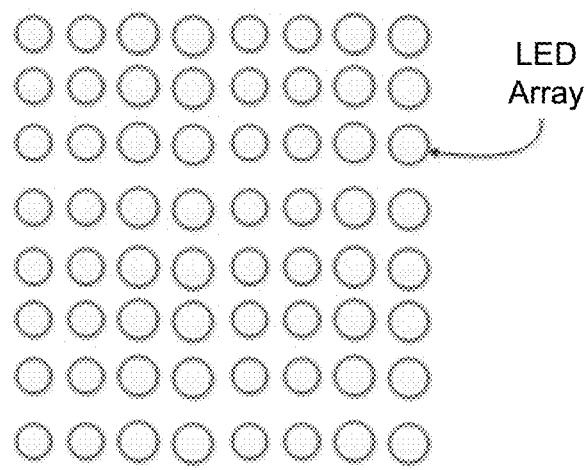
Figure 3B:
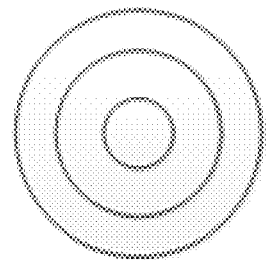
Figure 3B:
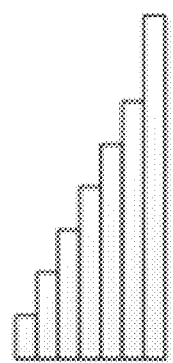

FIG. 3B illustrates a larger array of LEDs. Although illustrated as a square or rectangle, other shapes may be possible such as an octagon similar to a stop sign, or a triangle similar to a highway caution sign. If multicolor LEDs are used, the LEDs may be configured to use patterns of red, green and yellow (including any mixtures of the three, yielding different colors, such as blue) based upon a detected pressure on a switch or sensor, such as an auxiliary switch, a signal inputted from an OBD connector, a signal from an on-board processor, a signal from a sensor such as a speedometer or accelerometer, and so forth. In some embodiments, a portion of the rectangular LED array may be lit to simulate a shape. Shape and color may be used simultaneously. For example, under a hard deceleration, a subset of the LED array of FIG. 3B may be lit to form an octagon, and furthermore the octagon may be lit as the color red. In contrast, under light deceleration, a subset of the LED array of FIG. 3B may be lit to form a triangle, and furthermore the triangle may be lit as the color yellow. If there is sufficient resolution in the LED array, more complex figure such as a stopped hand (similar to that used in a "don't walk" signal at a crosswalk) may be used. In the embodiment capable of showing acceleration, the figure may be similar to that use in a "walk" signal at a crosswalk.

FIG. 3C illustrates an electroluminescent (EL) display arranged as a set of concentric circles or arcs. The electroluminescent display technology may include LEDs. A portion of the display of FIG. 3C will be lit, depending upon a monitored parameter (e.g., deceleration). For example, a light deceleration may be indicated by only the central EL portion being lit; a harder deceleration may be indicated by the two innermost EL circles or arcs being lit, and a maximum deceleration may be indicated by all EL circles or arcs being lit.

In another embodiment, the EL display may be configured such that the circles or arcs as a whole form a display that has a characteristic correlating with the monitored parameter. For example, a light deceleration may be indicated by a repeated slow progression loop of only the central EL portion being lit, to the two innermost EL circles or arcs being lit, to all EL circles or arcs being lit. The loop would be repeated while the light deceleration is still taking place. Increasing levels of the monitored parameter (e.g., deceleration) may be indicated by progressively faster progressions of the loop.

In another embodiment, the circles or arcs may be configured to simulate a spinning display. A rate of apparent spin may be positively correlated with the monitored parameter.

FIG. 3D illustrates an electroluminescent (EL) display arranged as a set of bars of monotonically differing heights. Bars also may be arranged horizontally. The electroluminescent display technology may include LEDs. A portion of the display of FIG. 3D will be lit, correlating with a monitored parameter (e.g., deceleration). For example, a light deceleration may be indicated by only the shortest EL portion being lit; a harder deceleration may be indicated by lighting the EL bars shorter than the average of all bars, and a maximum deceleration may be indicated by all EL bars being lit.

In another embodiment, the EL display may be configured such that the bars as a whole form a display that has a characteristic depending upon the monitored parameter. For example, a light deceleration may be indicated by a repeated slow progression loop beginning with only the shortest bar being lit, with each shortest unlit bar being successively lit, to all EL bars being lit. The loop would be repeated while the light deceleration is still taking place. Increasing levels of the monitored parameter (e.g., deceleration) may be indicated by progressively faster progressions of the loop.

In other embodiments not tied to any specific display shape or technology, the monitored parameter may be an acceleration (i.e., a positive change in speed over time). For example, auxiliary lights 107 may have a green color when indicating acceleration, with a parameter of the green auxiliary lights 107 positively correlated with a parameter of the acceleration.

Figure 4:
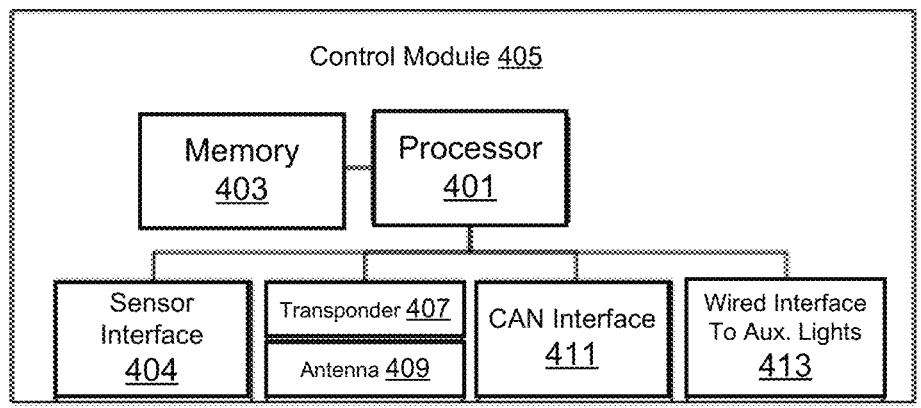
FIG. 4 illustrates a functional block diagram of a control module, in accordance with an embodiment of the present invention.

FIG. 4 illustrates a functional block diagram 400 of an embodiment of control module 405. Control module 405 may represent either control module 105 or control module 205. Diagram 400 includes processor 401 coupled to memory 403. Processor 401 may be coupled to one or both of sensor interface 404 and CAN interface 411. Processor 401 also may be coupled to one or both of transponder 407 and wired interface 413 to auxiliary lights 107. If transponder 407 is provided, it also may be coupled to antenna 409. Antenna 409, if provided, may be internal or external to a body of control module 105. Sensor interface 404 couples externally to a sensor such as sensor 104.

Figure 5:
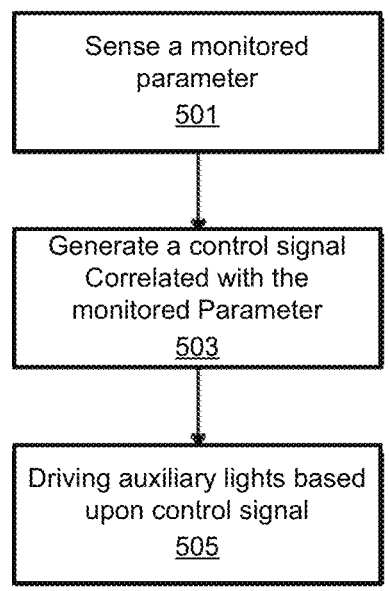
FIG. 5 illustrates a method in accordance with an embodiment of the present invention.

FIG. 5 illustrates a process 500 in accordance with an embodiment of the present invention. Process 500 begins at step 501, at which a monitored parameter is sensed. For example, the monitored parameter may be a force detected by sensor 104, a pressure detected by a pressure sensor, or an acceleration of the car detected by an accelerometer.

Next, process 500 transitions to step 503, at which a control signal correlated with the monitored parameter is generated. For example, step 503 may normalize the control signal from step 501 into a control signal having standard range, such as 0% to 100%, producing a normalized control signal. The normalized control signal may be further converted into a parameter of a control signal, such as a normalized control signal of 40% being converted into 40% of auxiliary lights being lit, or a normalized control signal of 50% being converted into 50% of a maximum rate of pulsation, and so forth.

Next, process 500 transitions to step 505, at which the control signal from step 503 is used to drive auxiliary lights 107. For example, if a pulsation rate of 50% of the maximum rate is desired, step 505 may provide electrical driving signals to each of LEDs 301 such that the overall LED display (e.g., one of FIGS. 3A-3D) appears to exhibit the desired rate of pulsation, change of color, change of spatial pattern, or other desired characteristic indicative of a gradient of braking force.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the disclosure. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the disclosure.

In certain implementations, multitasking and parallel processing may be advantageous. Nevertheless, it will be understood that various modifications may be made without departing from the spirit and scope of the disclosure.

What is claimed is:

1. An auxiliary lighting system for a motor vehicle to indicate the magnitude of a braking action, the auxiliary lighting system comprising:
   a sensor coupled to a mechanism for controlling acceleration or deceleration of the motor vehicle;
   a control module in a logical connection with the sensor, wherein the control module comprises a transmitter;
   a light assembly comprising a light-emitting diode (LED) and an LED driver in the logical connection with the control module, wherein the LED driver comprises a receiver, and the logical connection is achieved through the transmission by the control module and reception by the LED driver of a wireless signal.

2. The auxiliary lighting system of claim 1, wherein the sensor comprises a pressure sensor.

3. The auxiliary lighting system of claim 1, wherein the sensor comprises an accelerometer.

4. The auxiliary lighting system of claim 1, wherein the sensor comprises a range finder.

5. The auxiliary lighting system of claim 1, wherein the sensor comprises a gyroscope.

6. The auxiliary lighting system of claim 1, wherein the wireless signal has a frequency between 20 kHz and 300 GHz.

7. The auxiliary lighting system of claim 1, wherein the sensor is coupled to a brake caliper.

8. The auxiliary lighting system of claim 1, wherein the logical connection is achieved by a hardwired communications link capable of transmitting direct electrical current.

9. The auxiliary lighting system of claim 1, wherein the control module is operative to transmit a pulse pattern at a frequency based upon a reading from the sensor to the LED driver, and wherein the LED driver is operative to cause the LED to pulse at the frequency.

10. The auxiliary lighting system of claim 1, wherein the light assembly comprises an array of lights.

11. The auxiliary lighting system of claim 10, wherein the control module is operative to transmit a spatial pattern based upon a reading from the sensor to the LED driver, and wherein the LED driver is operative to cause the array of lights to activate based upon the spatial pattern.

12. The auxiliary lighting system of claim 10, wherein the control module is operative to transmit a signal comprising color instructions based upon a reading from the sensor to the LED driver, and wherein the LED driver is operative to cause the array of lights to display the instructed color.

13. The auxiliary lighting system of claim 10, wherein the array of lights comprises an electroluminescent display.

14. An auxiliary lighting system for a motor vehicle to indicate the magnitude of a braking action, the auxiliary lighting system comprising:
- a sensor coupled to a mechanism for controlling acceleration or deceleration of the motor vehicle;
- a control module in a logical connection with the sensor;
- a light assembly comprising a light-emitting diode (LED) and an LED driver in the logical connection with the control module, wherein the control module is operative to transmit a pulse pattern at a frequency based upon a reading from the sensor to the LED driver, and wherein the LED driver is operative to cause the LED to pulse at the frequency.

15. The auxiliary lighting system of claim 14, wherein the sensor comprises a pressure sensor.

16. The auxiliary lighting system of claim 14, wherein the control module further comprises a transmitter, the LED driver comprises a receiver, and the logical connection is achieved through the transmission by the control module and reception by the LED driver of a wireless signal.

17. The auxiliary lighting system of claim 16, wherein the wireless signal has a frequency between around 20 kHz and around 300 GHz.

18. The auxiliary lighting system of claim 16, wherein the light assembly comprises an array of lights.

19. The auxiliary lighting system of claim 16, wherein the control module is operative to transmit a spatial pattern based upon a reading from the sensor to the LED driver, and wherein the LED driver is operative to cause the array of lights to activate based on the spatial pattern.

20. The auxiliary lighting system of claim 16, wherein the control module is operative to transmit a signal comprising color instructions based upon a reading from the sensor to the LED driver, and wherein the LED driver is operative to cause the array of lights to display the instructed color.

* * * * *